United States Patent
Sanada et al.

(10) Patent No.: US 10,923,255 B2
(45) Date of Patent: Feb. 16, 2021

(54) MAGNETIC MATERIAL, PERMANENT MAGNET, ROTARY ELECTRICAL MACHINE, AND VEHICLE

(71) Applicant: KABUSHIKI KAISHA TOSHIBA, Tokyo (JP)

(72) Inventors: Naoyuki Sanada, Kanagawa (JP); Masaya Hagiwara, Kanagawa (JP); Shinya Sakurada, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/283,857

(22) Filed: Feb. 25, 2019

(65) Prior Publication Data
US 2019/0189314 A1 Jun. 20, 2019

Related U.S. Application Data

(63) Continuation of application No. PCT/JP2018/007931, filed on Mar. 2, 2018.

(30) Foreign Application Priority Data

Sep. 19, 2017 (JP) .................................. 2017-179072

(51) Int. Cl.
H01F 1/055 (2006.01)
C22C 38/00 (2006.01)
(Continued)

(52) U.S. Cl.
CPC ........... *H01F 1/055* (2013.01); *C22C 38/002* (2013.01); *C22C 38/005* (2013.01); *C22C 38/02* (2013.01);
(Continued)

(58) Field of Classification Search
CPC ..... C22C 38/002; C22C 38/005; C22C 38/02; C22C 38/04; C22C 38/06; C22C 38/08;
(Continued)

(56) References Cited

U.S. PATENT DOCUMENTS

| 5,480,495 A | 1/1996 | Sakurada et al. |
| 2014/0139063 A1 | 5/2014 | Horiuchi et al. |

(Continued)

FOREIGN PATENT DOCUMENTS

| EP | 0386286 | 9/1990 |
| JP | 57-104202 | 6/1982 |

(Continued)

OTHER PUBLICATIONS

Kuno, et al. "(Sm,Zr)(Fe,Co)11.0-11.5Ti1.0-0.5 compounds as new permanent magnet materials", AIP Advances 6, 025221 (2016).

(Continued)

*Primary Examiner* — Tulsidas C Patel
*Assistant Examiner* — Rashad H Johnson
(74) *Attorney, Agent, or Firm* — Amin, Turocy & Watson, LLP

(57) ABSTRACT

A magnetic material is expressed by a composition formula: $(R_{1-x}Z_x)_a M_b T_c$, and includes a main phase having a $ThMn_{12}$ crystal structure. In the $ThMn_{12}$ crystal structure, when an amount of the element Z occupying 2a site is $Z_{2a}$ atomic percent, an amount of the element Z occupying 8i site is $Z_{8i}$ atomic percent, an amount of the element Z occupying 8j site is $Z_{8j}$ atomic percent, and an amount of the element Z occupying 8f site is $Z_{8f}$ atomic percent, $Z_{2a}$, $Z_{8i}$, $Z_{8j}$, and $Z_{8f}$ satisfy $(Z_{8i}+Z_{8j}+Z_{8f})/(Z_{2a}+Z_{8i}+Z_{8j}+Z_{8f})<0.1$.

19 Claims, 4 Drawing Sheets

(51) Int. Cl.
*C22C 38/02* (2006.01)
*C22C 38/04* (2006.01)
*C22C 38/06* (2006.01)
*C22C 38/08* (2006.01)
*C22C 38/10* (2006.01)
*C22C 38/14* (2006.01)
*C22C 38/16* (2006.01)
*H02K 7/00* (2006.01)
*H02K 7/18* (2006.01)
*H01F 1/059* (2006.01)

(52) U.S. Cl.
CPC .............. *C22C 38/04* (2013.01); *C22C 38/06* (2013.01); *C22C 38/08* (2013.01); *C22C 38/10* (2013.01); *C22C 38/14* (2013.01); *C22C 38/16* (2013.01); *H01F 1/0557* (2013.01); *H02K 7/003* (2013.01); *H02K 7/1823* (2013.01); *C22C 2202/02* (2013.01); *H01F 1/0593* (2013.01)

(58) Field of Classification Search
CPC ......... C22C 38/10; C22C 38/14; C22C 38/16; C22C 2202/02; H01F 1/055; H01F 1/0557; H01F 1/0593; H02K 7/003; H02K 7/1823
USPC .............................. 310/75 R, 154.06, 154.43
See application file for complete search history.

(56) References Cited

U.S. PATENT DOCUMENTS

| | | | | |
|---|---|---|---|---|
| 2016/0086703 | A1* | 3/2016 | Suzuki | H01F 1/0577 252/62.55 |
| 2016/0087517 | A1* | 3/2016 | Powell | H02K 16/00 310/103 |
| 2016/0141083 | A1* | 5/2016 | Ito | H01F 1/0572 252/62.55 |
| 2016/0148734 | A1 | 5/2016 | Karimi et al. | |
| 2017/0084370 | A1 | 3/2017 | Sakuma et al. | |
| 2017/0178772 | A1 | 6/2017 | Sakuma et al. | |
| 2018/0061539 | A1 | 3/2018 | Hagiwara et al. | |
| 2019/0189315 | A1* | 6/2019 | Hagiwara | C22C 38/005 |
| 2019/0295751 | A1* | 9/2019 | Hagiwara | C22C 38/005 |

FOREIGN PATENT DOCUMENTS

| | | |
|---|---|---|
| JP | 04-322406 | 11/1992 |
| JP | 05-226123 | 9/1993 |
| JP | 06-283316 | 10/1994 |
| JP | 10-041116 | 2/1998 |
| JP | 2008-029148 | 2/2008 |
| JP | 2008-043172 | 2/2008 |
| JP | 2014-101547 | 6/2014 |
| JP | 2016-058707 | 4/2016 |
| JP | 2016-528717 | 9/2016 |
| JP | 2017-57471 | 3/2017 |
| JP | 2017-073544 | 4/2017 |
| JP | 2017-112300 | 6/2017 |
| WO | 2016-162990 | 10/2016 |

OTHER PUBLICATIONS

Chang, et al. Magnetic studies of $(Y_{1-x}Nd_x)(Fe_{1-y}Co_y)115Mo005N$ alloy powders, Journal of Alloys and Compounds 222 (1995) 87-91.
Xiao, et al. Crystal structure and spin reorientation transition of $Th_{1-x}Y_xFe_{11}Mo$ compounds, J. Phys. D: Appl. Phys. 39 (2006) 615-620.
Hu, et al. Intrinsic magnetic properties of the iron-rich $ThMn_{12}$-structure alloys $R(Fe_{11} Ti)$, R=Y, Nd, Sm, Gd, Tb, Dy, Ho, Er, Tm and Lu, J. Phys.: Condens. Matter 1 (1989) 755-770. Printed in the UK.
International Search Report and Written Opinion for International Application No. PCT/JP2018/007931 dated Jul. 25, 2018, 13 pages.
Wang, et al. "A study of the magnetocrystalline anisotropy of $RFe_{11-x}Co_xTi$ compounds with R=Y and Er", J. Phys.: Condens. Matter 13 (2001) 1617-1626.

* cited by examiner

United States Patent US 10,923,255 B2

MAGNETIC MATERIAL, PERMANENT MAGNET, ROTARY ELECTRICAL MACHINE, AND VEHICLE

CROSS-REFERENCE TO RELATED APPLICATIONS

This application is a continuation of prior International Application No. PCT/JP2018/007931 filed on Mar. 2, 2018, which is based upon and claims the benefit of priority from Japanese Patent Application No. 2017-179072 filed on Sep. 19, 2017; the entire contents of all of which are incorporated herein by reference.

FIELD

Embodiments described herein generally relate to a magnetic material, a permanent magnet, a rotary electrical machine, and a vehicle.

BACKGROUND

Permanent magnets are used for products in a wide field including, for example, rotary electrical machines such as a motor and a generator, electrical apparatuses such as a speaker and a measuring device, and vehicles such as an automobile and a railroad vehicle. In recent years, reduction in size of the above-described products has been demanded, and high-performance permanent magnets with high magnetization and high coercive force have been desired.

As examples of high-performance permanent magnets, there can be cited rare-earth magnets such as Sm—Co based magnets and Nd—Fe—B based magnets, for example. In these magnets, Fe and Co contribute to increase in saturation magnetization. Further, these magnets contain rare-earth elements such as Nd and Sm, which bring about a large magnetic anisotropy which is derived from a behavior of 4f electrons of the rare-earth elements in a crystal field. Consequently, it is possible to obtain a large coercive force.

DETAILED DESCRIPTION

Figure 1:
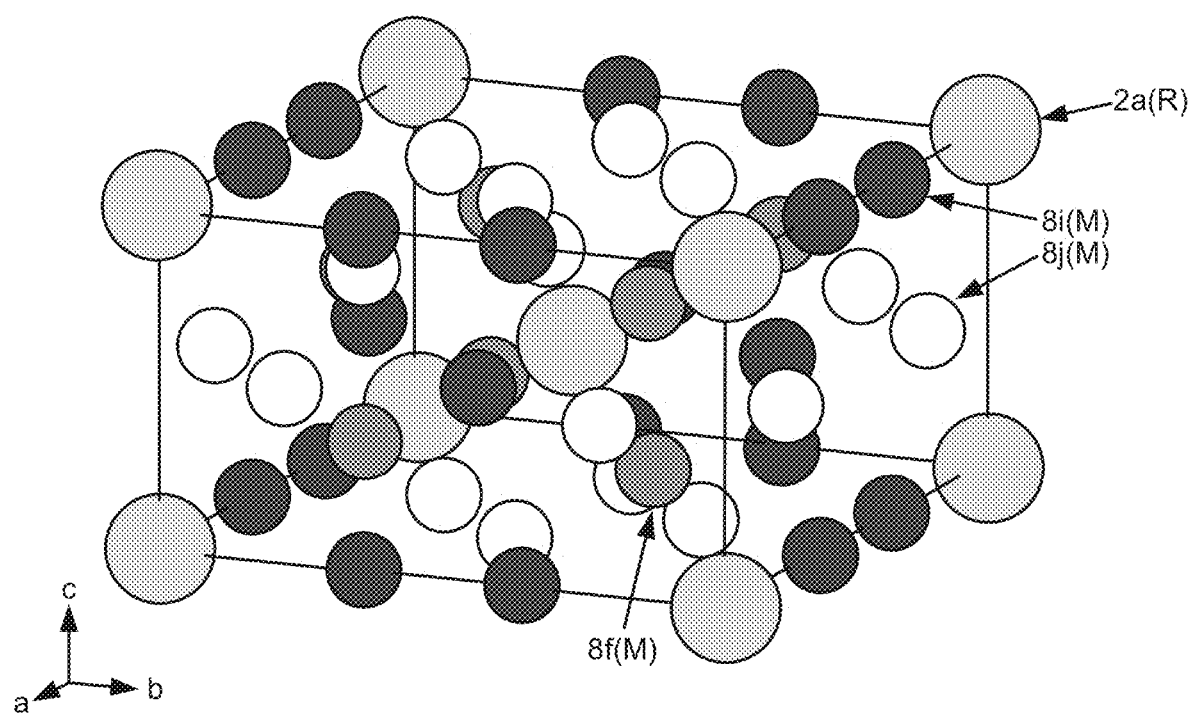
FIG. 1 is a schematic diagram illustrating a structural example of a $ThMn_{12}$ crystal structure.

A magnetic material of an embodiment is expressed by a composition formula 1: $(R_{1-x}Z_x)_aM_bT_c$. R is at least one element selected from the group consisting of rare-earth elements, Z is at least one element selected from the group consisting of Y, Zr, and Hf, M is Fe or Fe and Co, T is at least one element selected from the group consisting of Ti, V, Nb, Ta, Mo, and W, x is a number satisfying $0.01 \leq x \leq 0.8$, a is a number satisfying $4 \leq a \leq 20$ atomic percent, b is a number satisfying $b = (100-a-c)$ atomic percent, and c is a number satisfying $0 < c < 7$ atomic percent. The magnetic material comprises a main phase having a $ThMn_{12}$ crystal structure.

In the $ThMn_{12}$ crystal structure, when an amount of the element Z occupying 2a site is $Z_{2a}$ atomic percent, an amount of the element Z occupying 8i site is $Z_{8i}$ atomic percent, an amount of the element Z occupying 8j site is $Z_{8j}$ atomic percent, and an amount of the element Z occupying 8f site is $Z_{8f}$ atomic percent, $Z_{2a}$, $Z_{8i}$, $Z_{8j}$, and $Z_{8f}$ satisfy $(Z_{8i}+Z_{8j}+Z_{8f})/(Z_{2a}+Z_{8i}+Z_{8j}+Z_{8f})<0.1$.

Hereinafter, embodiments will be described while referring to the drawings. Note that the drawings are schematically illustrated, and, for example, a relationship between a thickness and a plane dimension, a ratio of thicknesses of respective layers, and the like, are sometimes different from actual ones. Further, in the embodiments, substantially the same components are denoted by the same reference numerals, and explanation thereof will be omitted.

First Embodiment

A magnetic material of this embodiment contains a rare-earth element, and an element M (M is Fe or Fe and Co). The above-described magnetic material includes a metal structure having a crystal phase as a main phase, and by increasing a concentration of the element M in the main phase, it is possible to improve saturation magnetization. The main phase is a phase having the highest volume occupancy ratio, among respective crystal phases and an amorphous phase in the magnetic material.

There can be cited, for example, a $ThMn_{12}$ crystal phase as the crystal phase containing the high-concentration element M. The $ThMn_{12}$ crystal phase has a crystal structure of tetragonal system ($ThMn_{12}$ crystal structure). In the magnetic material having the $ThMn_{12}$ crystal phase as its main phase, the high saturation magnetization can be obtained due to the high concentration element M.

The magnetic material of this embodiment has a composition expressed by a composition formula: $(R_{1-x}Z_x)_aM_bT_c$ (in the formula, R is a rare-earth element of one kind or more, Z is at least one element selected from the group consisting of Y, Zr, and Hf, M is Fe or Fe and Co, T is at least one element selected from the group consisting of Ti, V, Nb, Ta, Mo, and W, x is a number satisfying $0.01 \leq x \leq 0.8$, a is a number satisfying $4 \leq a \leq 20$ atomic percent, b is a number satisfying $b = (100-a-c)$ atomic percent, and c is a number satisfying $0 < c < 7$ atomic percent). The magnetic material may contain inevitable impurities.

The element Z is an element effective for stabilization of the $ThMn_{12}$ crystal phase. Specifically, the element Z is at least one element selected from yttrium (Y), zirconium (Zr), and hafnium (Hf). The element Z can mainly increase stability of the $ThMn_{12}$ crystal phase through reduction in a crystal lattice caused when it replaces the element R in the main phase, and the like. When an addition amount of the element Z is too small, it is not possible to sufficiently achieve an effect of increasing the stability of the $ThMn_{12}$ crystal phase. When the addition amount of element Z is too large, an anisotropic field of the magnetic material significantly lowers. It is preferable that x is a number satisfying $0.01 \leq x \leq 0.8$, it is more preferable that x is a number satisfying $0.05 \leq x < 0.5$, and it is still more preferable that x is a number satisfying $0.1 \leq x \leq 0.4$.

The element R is a rare-earth element of one kind or more, and an element capable of providing large magnetic anisotropy to the magnetic material, and giving high coercive force to a permanent magnet. The element R is, concretely, at least one element selected from the group consisting of lanthanum (La), cerium (Ce), praseodymium (Pr), neodymium (Nd), promethium (Pr), samarium (Sm), europium (Eu), gadolinium (Gd), terbium (Tb), dysprosium (Dy), holmium (Ho), erbium (Er), thulium (Tm), ytterbium (Yb), and lutetium (Lu), and it is preferable to use Sm, in particular. For example, when a plurality of elements including Sm are used as the element R, by setting a Sm concentration to 50 atomic percent or more of all of the elements capable of being applied as the element R, it is possible to increase the performance, for example, the coercive force of the magnetic material.

The concentration a of the element R and the element Z is preferably a number satisfying $4 \leq a \leq 20$ atomic percent, for example. When the concentration a is less than 4 atomic percent, a large amount of a α-(Fe, Co) phase precipitates, which decreases the coercive force. When the concentration a exceeds 20 atomic percent, an amount of the main phase contained in the magnetic material decreases, which decreases the saturation magnetization. The concentration a of the element R and the element Z is more preferably a number satisfying $5 \leq a \leq 18$ atomic percent, and still more preferably a number satisfying $7 \leq a \leq 15$ atomic percent.

The element M is Fe or Fe and Co, and is an element responsible for high saturation magnetization of the magnetic material. When compared between Fe and Co, Fe causes higher magnetization, so that Fe is an essential element, and 30 atomic percent or more of the element M is Fe in the magnet of this embodiment. By making the element M contain Co, the Curie temperature of the magnetic material increases, resulting in that the decrease in the saturation magnetization in a high-temperature region can be suppressed. Further, by adding a small amount of Co, the saturation magnetization can be further increased, when compared to a case where Fe is solely used. On the other hand, if a Co ratio is increased, the decrease in the anisotropic field is caused. Further, if the Co ratio is too high, the decrease in the saturation magnetization is also caused. For this reason, by appropriately controlling the ratio between Fe and Co, it is possible to simultaneously enable high saturation magnetization, high anisotropic field, and high Curie temperature. When M in the composition formula: $(R_{1-x}Z_x)_a M_b T_c$ is represented as $(Fe_{1-y}Co_y)$, a desirable value of y is $0.01 \leq y < 0.7$, the value is more preferably $0.01 \leq y < 0.5$, and still more preferably $0.01 \leq y \leq 0.3$. 20 atomic percent or less of the element M may be replaced with at least one element selected from aluminum (Al), silicon (Si), chromium (Cr), manganese (Mn), nickel (Ni), copper (Cu), and gallium (Ga). The above-described elements contribute to growth of crystal grains which form the main phase, for example.

The element T is at least one element selected from the group consisting of titanium (Ti), vanadium (V), niobium (Nb), tantalum (Ta), molybdenum (Mo), and tungsten (W), for example. By adding the element T, it is possible to stabilize the $ThMn_{12}$ crystal phase. However, by the introduction of the element T, the concentration of the element M decreases, resulting in that the saturation magnetization of the magnetic material easily decreases. In order to increase the concentration of the element M, it is only required to decrease the addition amount of the element T, but, in such a case, the stability of the $ThMn_{12}$ crystal phase is lost, and the α-(Fe, Co) phase precipitates, which leads to decrease in the coercive force of the magnetic material. The addition amount c of the element T is preferably a number satisfying $0 < c < 7$ atomic percent. Consequently, it is possible to stabilize the $ThMn_{12}$ crystal phase while suppressing the precipitation of the α-(Fe, Co) phase. It is more preferable that 50 atomic percent or more of the element T is Ti or Nb. By using Ti or Nb, even if the content of the element T is reduced, it is possible to greatly reduce the precipitation amount of the α-(Fe, Co) phase while stabilizing the $ThMn_{12}$ crystal phase.

Though the element Z mainly replaces the element R in the $ThMn_{12}$ crystal structure, a part of the element Z may replace the element M. When the element Z replaces the element M, the concentration of the element M decreases, resulting in that the saturation magnetization of the magnetic material decreases similar to the case of the element T. An amount of the element Z replacing the element M is preferably less than 10 atomic percent among all of the added element Z. It is more preferably 5 atomic percent or less.

FIG. 1 is a schematic diagram illustrating an example of the $ThMn_{12}$ crystal structure. The $ThMn_{12}$ crystal structure illustrated in FIG. 1 is provided along an a axis, a b axis, and a c axis. The element R occupies an atomic position represented by Wyckoff position 2a (also called 2a site) in the $ThMn_{12}$ crystal structure, and the element M occupies each of three atomic positions represented by Wyckoff positions 8i, 8j, 8f (also called 8i site, 8j site, 8f site) in the $ThMn_{12}$ crystal structure. In this case, an amount of the element Z occupying the 2a site in the $ThMn_{12}$ crystal structure can be represented by $Z_{2a}$ atomic percent, an amount of the element Z occupying the 8i site can be represented by $Z_{8i}$ atomic percent, an amount of the element Z occupying the 8j site can be represented by $Z_{8j}$ atomic percent, and an amount of the element Z occupying the 8f site can be represented by $Z_{8f}$ atomic percent. When the amount of the element Z replacing the element M is less than 10 atomic percent of all of the elements Z contained in the magnetic material, $Z_{2a}$, $Z_{8i}$, $Z_{8j}$, and $Z_{8f}$ satisfy $(Z_{8i}+Z_{8j}+Z_{8f})/(Z_{2a}+Z_{8i}+Z_{8j}+Z_{8f}) < 0.1$. The state where $(Z_{8i}+Z_{8j}+Z_{8f})/(Z_{2a}+Z_{8i}+Z_{8j}+Z_{8f}) < 0.1$ is satisfied indicates that the amount of the element Z replacing the element M is small. The saturation magnetization of the magnetic material can be increased by satisfying $(Z_{8i}+Z_{8j}+Z_{8f})/(Z_{2a}+Z_{8i}+Z_{8j}+Z_{8f}) < 0.1$.

The magnetic material of this embodiment may further contain an element A. At this time, a composition of the magnetic material is expressed by a composition formula: $(R_{1-x}Z_x)_a M_b T_c A_d$ (in the formula, R is a rare-earth element of one kind or more, Z is at least one element selected from the group consisting of Y, Zr, and Hf, T is at least one element selected from the group consisting of Ti, V, Nb, Ta, Mo, and W, M is Fe or Fe and Co, A is at least one element selected from the group consisting of N, C, B, H, and P, x is a number satisfying $0.01 \leq x \leq 0.8$, a is a number satisfying $4 \leq a \leq 20$ atomic percent, c is a number satisfying $0 < c < 7$ atomic percent, b is a number satisfying $b = 100 - a - c - d$ atomic percent, and d is a number satisfying $0 < d \leq 18$ atomic percent).

The element A is at least one element selected from nitrogen (N), carbon (C), boron (B), hydrogen (H), and phosphorus (P). The element A has a function of entering a crystal lattice of the $ThMn_{12}$ crystal phase to cause at least one of enlargement of the crystal lattice and change in electronic structure, for example. Consequently, it is possible to change the Curie temperature, the magnetic anisotropy, and the saturation magnetization. The element A does not always have to be added, except for inevitable impurities.

When 50 atomic percent or more of the element R is Sm (when a main component of the element R is Sm), the magnetic anisotropy of the $ThMn_{12}$ crystal phase changes from a c axis direction to a direction oriented in a plane perpendicular to the c axis due to the entrance of the element A, which decreases the coercive force. For this reason, it is preferable that the element A is not added except for inevitable impurities. On the contrary, when 50 atomic percent or more of the element R is at least one element selected from Ce, Pr, Nd, Tb, and Dy (when the main component of the element R is at least one element selected from Ce, Pr, Nd, Tb, and Dy), the magnetic anisotropy of the $ThMn_{12}$ crystal phase changes from the direction oriented in the plane perpendicular to the c axis to the c axis direction due to the entrance of the element A, which enables to increase the coercive force. For this reason, the element A is preferably added. When the element A is added, the concentration d of the element A is preferably a number satisfying $0<d\le18$ atomic percent. When the concentration d exceeds 18 atomic percent, the stability of the $ThMn_{12}$ crystal phase decreases. The concentration d of the element A is more preferably a number satisfying $0<d\le14$ atomic percent.

Magnetic physical properties such as the saturation magnetization of the magnetic material are calculated by using a vibrating sample magnetometer (VSM), for example.

The composition of the magnetic material is measured through, for example, ICP-AES (inductively coupled plasma-atomic emission spectroscopy), SEM-EDX (scanning electron microscope-energy dispersive X-ray spectroscopy), TEM-EDX (transmission electron microscope-energy dispersive X-ray spectroscopy), or the like.

The concentrations of the respective elements of the main phase are measured by using the SEM-EDX, for example. For example, the main phase can be specified by an observation image obtained through the SEM and a mapping image of each element of a measurement sample of the magnetic material obtained through the SEM-EDX. The amount of the element Z replacing the element M among all of the added element Z can be defined as follows from the measured concentrations of the respective elements of the main phase. When the main phase is the $ThMn_{12}$ crystal phase, and the composition of the magnetic material is expressed by a composition formula: $(R_{1-x}Z_{x-s})_aM_bT_cZ_{sa}$, a value of s which satisfies a: $b+c+sa=1:12$ ($b+c+sa=12a$) is calculated. In this case, a value of a ratio of s to x ($s/x$) corresponds to the amount of the element Z replacing the element M among all of the added element Z, that is, the value of $(Z_{8i}+Z_{8j}+Z_{8f})/(Z_{2a}+Z_{8i}+Z_{8j}+Z_{8f})$.

The magnetic material of this embodiment is expressed by a composition formula: $(R_{1-x}Z_{x-s})_aM_bT_cZ_{sa}$ (in the formula, R is a rare-earth element of one kind or more, Z is at least one element selected from the group consisting of Y, Zr, and Hf, M is Fe or Fe and Co, T is at least one element selected from the group consisting of Ti, V, Nb, Ta, Mo, and W, x is a number satisfying $0.01\le x\le0.8$, a is a number satisfying $4\le a\le20$ atomic percent, b is a number satisfying $b=(100-a-c)$ atomic percent, c is a number satisfying $0<c<7$ atomic percent, and s is a number satisfying $b+c+sa=12a$), and a ratio of s to x is less than 0.1.

A magnitude relation among $Z_{8i}$, $Z_{8j}$, $Z_{8f}$ is determined by, for example, Rietveld analysis of an X-ray diffraction (XRD) measurement result. When the main phase has the $ThMn_{12}$ crystal structure, it is defined that a crystal structure model where a part of the element M at each of the element M positions (Wyckoff positions 8i, 8j, or 8f) is replaced with the element Z is used, and a large amount of the element M at the element M position is replaced with the element Z when fitting accuracy of the measurement result by the Rietveld analysis becomes higher. Concretely, Rietveld analysis software such as RIETAN is used, various parameters such as a background function, a profile function, a scale factor, a lattice constant, and a preferred orientation function are optimized by using the $ThMn_{12}$ crystal structure model where the element M at the element M position is not replaced with the element Z, and the fitting of the XRD measurement result is performed. After that, the parameters are fixed, and optimization of an occupancy ratio is performed by using three kinds of crystal structure models each having the occupancy ratio of the element Z at each of the three kinds of element M positions.

The crystal structure model is determined where the occupancy ratio is a positive value, and the analysis result where an index indicating a degree of fitting such as various R factors becomes minimum can be obtained, then it is estimated that a largest amount of the element Z replaces at a replacement position of the element Z in the crystal structure model, and the magnitude relation among $Z_{8i}$, $Z_{8j}$, $Z_{8f}$ is determined. For example, when the crystal structure model where the element M at the Wyckoff position 8f is replaced with the element Z has the occupancy ratio of the positive value and the index indicating the fitting degree becomes the minimum compared to the other two crystal structure models, that is, the crystal structure model where the element M at the Wyckoff position 8i is replaced with the element Z and the crystal structure model where the element M at the Wyckoff position 8j is replaced with the element Z, $Z_{8i}$, $Z_{8j}$, $Z_{8f}$ satisfy $Z_{8f}>Z_{8i}$ and $Z_{8f}>Z_{8j}$.

Next, an example of a manufacturing method of the magnetic material of this embodiment will be described. First, an alloy containing predetermined elements required for the magnetic material is manufactured. The alloy can be manufactured by using, for example, an arc melting method, a high-frequency melting method, a metal mold casting method, a mechanical alloying method, a mechanical grinding method, a gas atomizing method, a reduction diffusion method, or the like. The α-(Fe, Co) phase generated in the manufactured alloy results in that the coercive force of a permanent magnet which is manufactured from this alloy decreases.

Further, the above-described alloy is melted to be subjected to rapid cooling. This enables to reduce the precipitation amount of the α-(Fe, Co) phase. The melted alloy is subjected to rapid cooling by using a strip cast method, for example. In the strip cast method, the alloy molten metal is tiltingly injected to a chill roll, to thereby manufacture an alloy thin strip. At this time, by controlling a rotation speed of the roll, a cooling rate of the molten metal can be controlled. The roll may be one of either a single-roll type or a twin-roll type.

Heat treatment is performed on the above-described alloy thin strip. This enables to homogenize the material. For example, heating is performed at a temperature of 800 to 1300° C. for 30 to 200 hours. Consequently, it becomes possible to increase the stability of the $ThMn_{12}$ crystal phase, to further improve both properties of the saturation magnetization and the anisotropic field. At the time when the rapid cooling is finished, the element Z may replace at not only the element R position (the Wyckoff position 2a) but also the element M position in the crystal structure due to the rapid cooling effect. The element Z replacing at the element M position gradually replaces at the element R position being an original proper position due to the subsequent heat treatment, to enable to reduce the amount of the element Z replacing at the element M position. The amount of the element Z replacing the element M can be sufficiently reduced by setting the heat treatment time for 30 hours or more. The heat treatment time is preferably 200 hours or less from a viewpoint of productivity. The heat treatment time is more preferably 50 to 150 hours.

It is also possible to make the element A enter the above-described alloy thin strip. It is preferable that the alloy is pulverized into a powder before the process of making the element A enter the alloy. When the element A is nitrogen, by heating the alloy thin strip for 1 to 100 hours in an atmosphere of nitrogen gas, ammonia gas, or the like at about 0.1 to 100 atmospheric pressure, in a temperature range of 200 to 700° C., it is possible to nitride the alloy thin strip to make the element N enter the alloy thin strip. When the element A is carbon, by heating the alloy thin strip for 1 to 100 hours in an atmosphere of $C_2H_2$, $CH_4$, $C_3H_8$, or CO gas or thermal decomposition gas of methanol at about 0.1 to 100 atmospheric pressure in a temperature range of 300 to 900° C., it is possible to carbonize the alloy thin strip to make the element C enter the alloy thin strip. When the element A is hydrogen, by heating the alloy thin strip for 1 to 100 hours in an atmosphere of hydrogen gas, ammonia gas, or the like at about 0.1 to 100 atmospheric pressure, in a temperature range of 200 to 700° C., it is possible to hydrogenate the alloy thin strip to make the element H enter the alloy thin strip. When the element A is boron, by making a raw material contain boron when manufacturing the alloy, it is possible to make boron to be contained in the alloy thin strip. When the element A is phosphorus, by phosphorizing the alloy thin strip, it is possible to make the element P enter the alloy thin strip.

The magnetic material is manufactured through the above-described processes. Further, the permanent magnet is manufactured by using the aforementioned magnetic material. For example, by pulverizing the aforementioned magnetic material, and then performing heat treatment such as sintering, a sintered magnet containing a sintered body of the aforementioned magnetic material is manufactured. Further, by pulverizing the aforementioned magnetic material and then performing solidification using a resin or the like, a bond magnet containing the aforementioned magnetic material is manufactured.

Second Embodiment

The permanent magnet including the sintered body of the magnetic material of the first embodiment can be used for various motors and generators. Further, it is possible to use the permanent magnet as a stationary magnet or a variable magnet of a variable magnetic flux motor or a variable magnetic flux generator. Various motors and generators are formed by using the permanent magnet of the first embodiment. When the permanent magnet of the first embodiment is applied to a variable magnetic flux motor, technologies disclosed in, for example, Japanese Patent Application Laid-open No. 2008-29148 or Japanese Patent Application Laid-open No. 2008-43172 can be applied to a configuration and a drive system of the variable magnetic flux motor.

Figure 2:
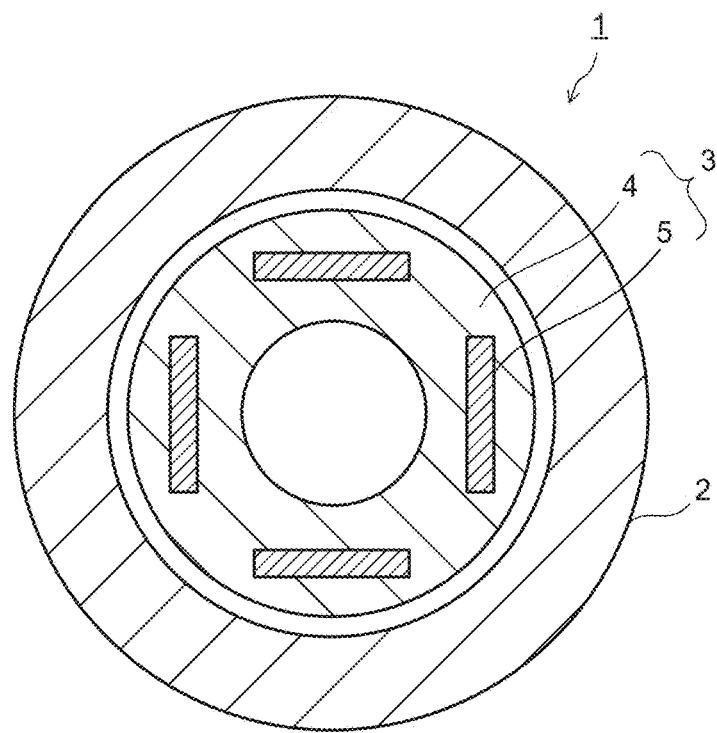
FIG. 2 is a diagram illustrating a permanent magnet motor.

Next, a motor and a generator including the above-described permanent magnet will be described with reference to the drawings. FIG. 2 is a diagram illustrating a permanent magnet motor. In a permanent magnet motor 1 illustrated in FIG. 2, a rotor 3 is disposed in a stator 2. In an iron core 4 of the rotor 3, permanent magnets 5 being the permanent magnets of the first embodiment are disposed. By using the permanent magnets of the first embodiment, high efficiency, reduction in size, cost reduction and the like of the permanent magnet motor 1 can be achieved based on properties and the like of the respective permanent magnets.

Figure 3:
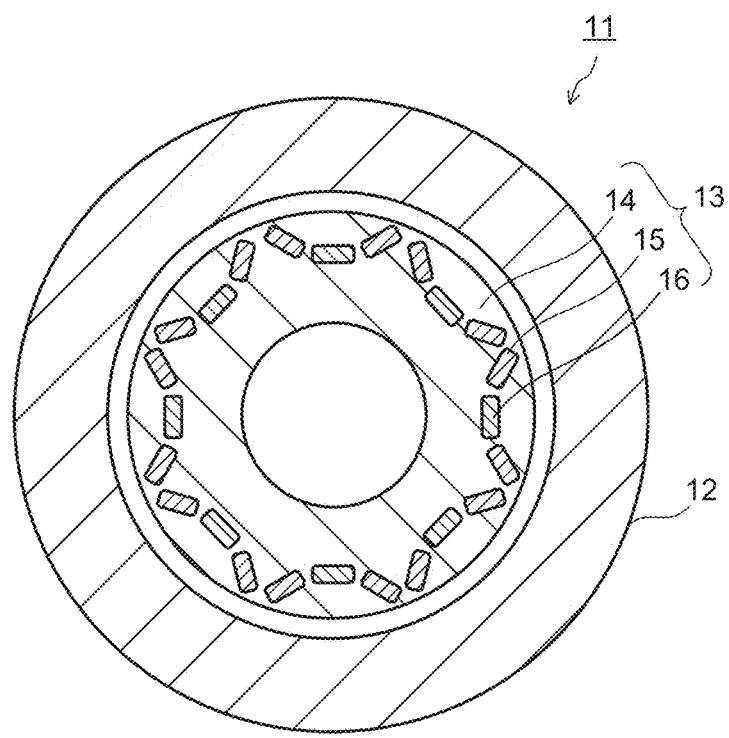
FIG. 3 is a diagram illustrating a variable magnetic flux motor.

FIG. 3 is a diagram illustrating a variable magnetic flux motor. In a variable magnetic flux motor 11 illustrated in FIG. 3, a rotor 13 is disposed in a stator 12. In an iron core 14 of the rotor 13, the permanent magnets of the first embodiment are disposed as stationary magnets 15 and variable magnets 16. A magnetic flux density (magnetic flux amount) of the variable magnet 16 is variable. A magnetization direction of the variable magnet 16 is orthogonal to a Q-axis direction, and thus the magnets are not affected by a Q-axis current, and can be magnetized by a D-axis current. A magnetization winding (not illustrated) is provided on the rotor 13. It is structured such that by passing a current through the magnetization winding from a magnetizing circuit, a magnetic field thereof operates directly on the variable magnet 16.

According to the permanent magnet of the first embodiment, it is possible to obtain the coercive force suitable for the stationary magnet 15. When the permanent magnet of the first embodiment is applied to the variable magnet 16, it is only required to control the coercive force, for example, to fall within a range of 100 kA/m or more and 500 kA/m or less by changing the manufacturing conditions. In the variable magnetic flux motor 11 illustrated in FIG. 3, the permanent magnets of the first embodiment can be used for both of the stationary magnet 15 and the variable magnet 16, but, it is also possible to use the permanent magnet of the first embodiment for either of the magnets. The variable magnetic flux motor 11 is capable of outputting a large torque from a small device size, and thus is preferred for a motor of a hybrid electric vehicle, electric vehicle, or the like required to have high output power and small size of the motor.

Figure 4:
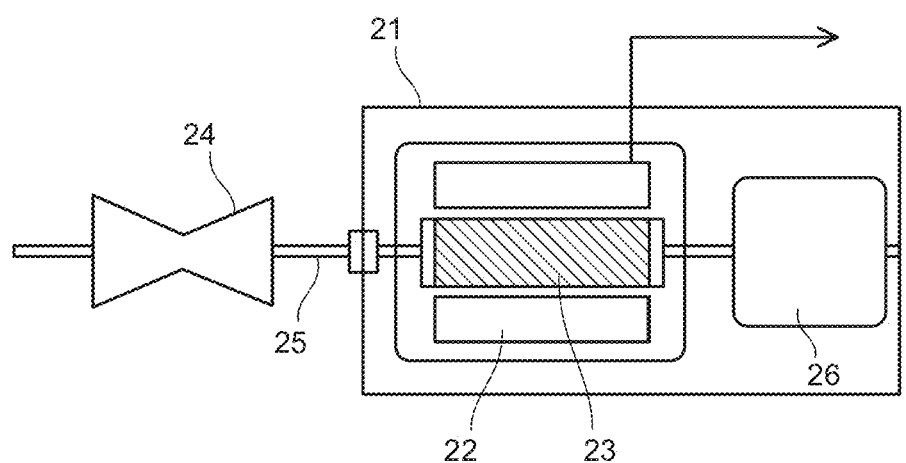
FIG. 4 is a diagram illustrating a generator.

FIG. 4 illustrates a generator. A generator 21 illustrated in FIG. 4 includes a stator 22 using the above-described permanent magnet. A rotor 23 disposed inside the stator 22 is connected via a shaft 25 to a turbine 24 provided at one end of the generator 21. The turbine 24 is rotated by an externally supplied fluid, for example. Instead of the turbine 24 rotated by the fluid, the shaft 25 can also be rotated by transmitting dynamic rotation such as regenerative energy of an automobile. To the stator 22 and the rotor 23, various publicly-known configurations can be used.

The shaft 25 is in contact with a commutator (not illustrated) disposed on an opposite side of the turbine 24 with respect to the rotor 23, and electromotive force generated by rotations of the rotor 23 is increased in voltage to a system voltage and transmitted as output of the generator 21 via isolated phase buses and a main transformer (not illustrated). The generator 21 may be either of an ordinary generator and a variable magnetic flux generator. A static electricity from the turbine 24 or charges by an axial current accompanying power generation occur on the rotor 23. For this reason, the generator 21 includes a brush 26 for discharging the charges of the rotor 23.

An use of the above-described permanent magnet to the generator enable effects such as high efficiency, reduction in size, and cost reduction.

Figure 5:
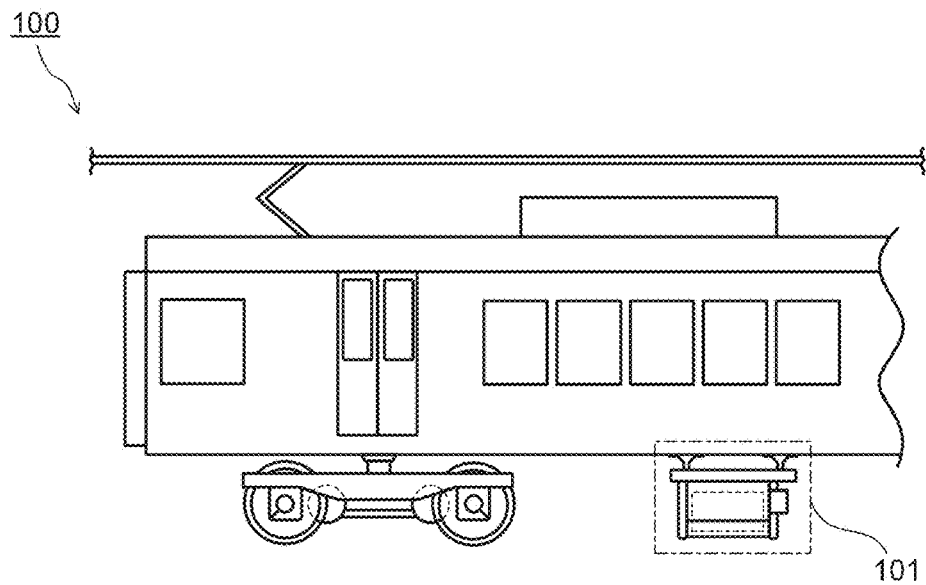
FIG. 5 is a schematic diagram illustrating a configuration example of a railway vehicle.

The above-described rotary electrical machine may be mounted on a railroad vehicle (one example of vehicle) used in railway traffic, for example. FIG. 5 is a diagram illustrating one example of a railroad vehicle 100 including a rotary electrical machine 101. As the rotary electrical machine 101, the motor in FIG. 2 or FIG. 3, the generator in FIG. 4 described above, or the like can be used. When the above-described rotary electrical machine is mounted as the rotary electrical machine 101, the rotary electrical machine 101 may be used as an electric motor (motor) which outputs a driving force by utilizing electric power supplied from a power transmission line or electric power supplied from a secondary battery mounted on the railroad vehicle 100, for example, or it may also be used as a generator which converts kinetic energy into electric power and supplies the electric power to various loads in the railroad vehicle 100. By utilizing a highly efficient rotary electric machine such as the rotary electrical machine of the embodiment, it is possible to make the railroad vehicle travel while saving energy.

Figure 6:
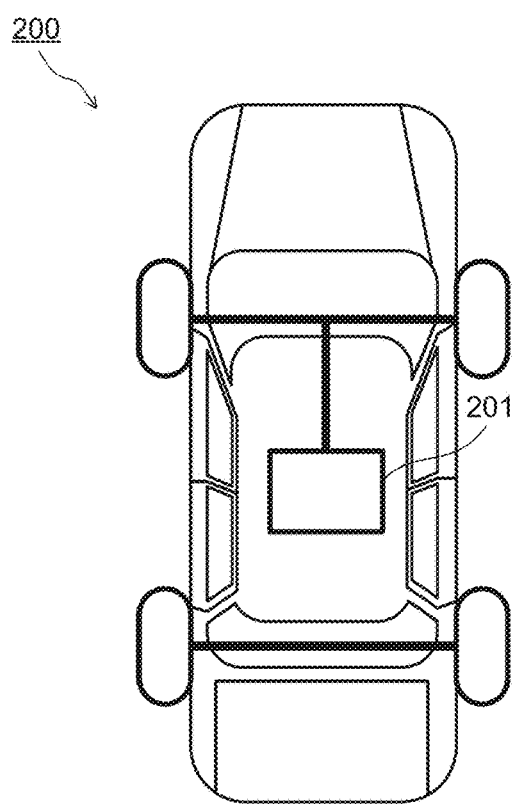
FIG. 6 is a schematic diagram illustrating a configuration example of an automobile.

The aforementioned rotary electrical machine may also be mounted on an automobile (another example of vehicle) such as a hybrid electric vehicle or an electric vehicle. FIG. 6 is a diagram illustrating one example of an automobile 200 including a rotary electrical machine 201. As the rotary electrical machine 201, the motor in FIG. 2 or FIG. 3, the generator in FIG. 4 described above, or the like can be used. When the above-described rotary electrical machine is mounted as the rotary electrical machine 201, the rotary electrical machine 201 may be used as an electric motor which outputs a driving force of the automobile 200, or it may also be used as a generator which converts kinetic energy at the time of traveling the automobile 200 into electric power. The rotary electrical machine may be mounted on, for example, industrial equipment (industrial motor), air-conditioning equipment (air conditioner, hot water supply compressor motor), a wind power generator, or an elevator (hoisting machine).

EXAMPLES

Examples 1 to 10

Appropriate amounts of raw materials were weighed to produce alloys by using the arc melting method. Next, each of the alloys was melted, and the obtained molten metal was subjected to rapid cooling by using the strip cast method, to thereby produce an alloy thin strip. The above-described alloy thin strips were heated for 50 to 100 hours at 1100° C. under an Ar atmosphere. After that, compositions of the alloy thin strips after being subjected to the heating were analyzed by using the ICP-AES. The compositions of the magnetic materials obtained by using the ICP-AES are presented in Table 1.

Next, each of the alloy thin strips was pulverized by a mortar to produce an alloy powder. After that, a crystal structure of each alloy powder was analyzed by the XRD measurement with a CuKα radiation source. As a result of the XRD measurement, it was confirmed that the alloy powder includes a metal structure having the $ThMn_{12}$ crystal phase as its main phase.

Next, concentrations of elements in the main phase were measured at five points, respectively, in three observation visual fields through the SEM-EDX measurement, and by calculating simple average at 15 points above, the concentration of each element in the main phase was calculated. As the measurement point, a point where the α-(Fe, Co) phase does not exist within a radius of 5 μm in an SEM image was selected. In the SEM observation, the observation was performed at an acceleration voltage of 30 kV by using SU8020 manufactured by Hitachi High-Technologies Corporation. In the SEM-EDX measurement, the measurement was conducted by using Octan-super (semiconductor element size: 60 mm$^2$) manufactured by EDAX, with a working distance set to 15 mm and a live time set to 100 seconds. In the calculation of the concentrations of the elements, only the constituent elements of the respective samples were set as calculation targets, in which Lα radiation was applied to Sm, Y, and Kα radiation was applied to Fe, Co, and Ti. Values of $(Z_{8i}+Z_{8j}+Z_{8f})/(Z_{2a}+Z_{8i}+Z_{8j}+Z_{8f})$ calculated from the measured respective concentrations of elements are presented in Table 1.

A VSM device was used to evaluate the magnetic physical properties of the magnetic material. A magnetic field of 9.0 T was applied in an in-plane direction of each of the alloy thin strips, and the magnetic field was then swept to −9.0 T, thereby measuring a magnetic field H and magnetization M. By applying a saturation asymptotic law expressed by the following formula with respect to tetragon, to a relationship between the magnetization M and the magnetic field intensity H during when the applied magnetic field was lowered from 9.0 T to 8.5 T, saturation magnetization Ms and anisotropic field $H_A$ of the entire magnetic material were calculated.

$$M=Ms(1-H_A^2/15H^2)(Ms \text{ indicates the saturation magnetization, and } H_A \text{ indicates the anisotropic field})$$

Based on peak intensity brought by the α-(Fe, Co) phase in an X-ray diffraction pattern, contribution of the α-(Fe, Co) phase with respect to the saturation magnetization was evaluated, and this was subtracted from the saturation magnetization of the entire magnetic material, to thereby determine the saturation magnetization of the main phase. Concretely, a powder sample having no peak intensity brought by the α-(Fe, Co) phase in the X-ray diffraction pattern was produced, and to the power sample, a powder sample having the α-(Fe, Co) phase was added and sufficiently mixed, to thereby produce a plurality of samples. A mass ratio of the powder sample having the α-(Fe, Co) phase in each of the plurality of samples was different within a range of 0 mass % or more and 21 mass % or less. When a crystal structure of each of the samples was analyzed through the XRD measurement, a ratio between the mass ratio of the powder sample having the α-(Fe, Co) phase and a maximum value of the peak intensity $I_{α-(Fe, Co)}/(I_{α-(Fe, Co)}+I_{ThMn12})$ was confirmed to have a linear relationship. Based on the above, a mass ratio of the α-(Fe, Co) phase was determined from the peak intensity of the α-(Fe, Co) phase in the X-ray diffraction pattern, and the mass ratio was converted into the contribution of the α-(Fe, Co) phase to the saturation magnetization.

Comparative Examples 1 and 2

Magnetic materials were each obtained through the similar processes as Example 1 except that the heat treatment time after the rapid cooling was set to 4 hours while setting a composition of an alloy thin strip as a value presented in Table 1. Values of $(Z_{8i}+Z_{8j}+Z_{8f})/(Z_{2a}+Z_{8i}+Z_{8j}+Z_{8f})$ and values of saturation magnetization of a main phase each analyzed through the similar method as Example 1 are presented in Table 1.

Comparative Examples 3 and 4

Magnetic materials were each obtained through the similar processes as Example 1 except that the heat treatment time after the rapid cooling was set to 20 hours while setting a composition of an alloy thin strip as a value presented in Table 1. Values of $(Z_{8i}+Z_{8j}+Z_{8f})/(Z_{2a}+Z_{8i}+Z_{8j}+Z_{8f})$ and values of saturation magnetization of a main phase each analyzed through the similar method as Example 1 are presented in Table 1.

TABLE 1

| | Composition of Magnetic Material | $(Z_{8i} + Z_{8j} + Z_{8f})/$ $(Z_{2a} + Z_{8i} + Z_{8j} + Z_{8f})$ | Saturation Magnetization (T) |
|---|---|---|---|
| Example 1 | $(Sm_{0.77}Y_{0.23})_{7.6}(Fe_{0.79}Co_{0.21})_{88.0}Ti_{4.4}$ | 0.03 | 1.58 |
| Example 2 | $(Sm_{0.72}Y_{0.14}Zr_{0.14})_{7.5}(Fe_{0.70}Co_{0.30})_{88.5}Ti_{4.0}$ | 0.05 | 1.55 |
| Example 3 | $(Sm_{0.71}Y_{0.19}Hf_{0.10})_{7.5}(Fe_{0.70}Co_{0.30})_{88.9}Ti_{3.6}$ | 0.09 | 1.55 |
| Example 4 | $(Sm_{0.71}Y_{0.29})_{7.5}(Fe_{0.70}Co_{0.29}Al_{0.01})_{88.9}Ti_{3.6}$ | 0.02 | 1.56 |
| Example 5 | $(Sm_{0.70}Y_{0.30})_{7.6}(Fe_{0.70}Co_{0.29}Si_{0.01})_{88.4}Ti_{4.0}$ | 0.01 | 1.57 |
| Example 6 | $(Sm_{0.70}Y_{0.30})_{7.5}(Fe_{0.70}Co_{0.29}Cr_{0.01})_{88.6}Ti_{3.9}$ | 0.04 | 1.57 |
| Example 7 | $(Sm_{0.71}Y_{0.29})_{7.5}(Fe_{0.70}Co_{0.29}Mn_{0.01})_{88.9}Ti_{3.6}$ | 0.03 | 1.56 |
| Example 8 | $(Sm_{0.70}Y_{0.30})_{7.5}(Fe_{0.70}Co_{0.29}Ni_{0.01})_{88.5}Ti_{4.0}$ | 0.01 | 1.57 |
| Example 9 | $(Sm_{0.71}Y_{0.29})_{7.7}(Fe_{0.70}Co_{0.29}Cu_{0.01})_{88.4}Ti_{3.9}$ | 0.03 | 1.56 |
| Example 10 | $(Sm_{0.71}Y_{0.29})_{7.7}(Fe_{0.70}Co_{0.29}Ga_{0.01})_{88.3}Ti_{4.0}$ | 0.05 | 1.57 |
| Comparative Example 1 | $(Sm_{0.71}Y_{0.29})_{7.3}(Fe_{0.71}Co_{0.29})_{89.0}Ti_{3.7}$ | 0.12 | 1.49 |
| Comparative Example 2 | $(Sm_{0.68}Zr_{0.32})_{7.7}(Fe_{0.70}Co_{0.30})_{88.2}Ti_{4.0}$ | 0.34 | 1.45 |
| Comparative Example 3 | $(Sm_{0.78}Zr_{0.22})_{6.8}(Fe_{0.70}Co_{0.30})_{89.3}Ti_{3.8}$ | 0.35 | 1.49 |
| Comparative Example 4 | $(Sm_{0.82}Y_{0.18})_{7.7}(Fe_{0.70}Co_{0.30})_{88.4}Ti_{3.9}$ | 0.13 | 1.53 |

As it is clear from Table 1, in each of the magnetic materials of Examples 1 to 10, $(Z_{8i}+Z_{8j}+Z_{8f})/(Z_{2a}+Z_{8i}+Z_{8j}+Z_{8f})<0.1$ (a ratio of s to x in a composition formula: $R_{1-x}Z_{x-s})_aM_bT_cZ_{sa}$ is less than 0.1) is satisfied, and high saturation magnetization is held.

On the other hand, in each of the magnetic materials of Comparative examples 1 to 4, $(Z_{8i}+Z_{8j}+Z_{8f})/(Z_{2a}+Z_{8i}+Z_{8j}+Z_{8f})<0.1$ is not satisfied, and the saturation magnetization is lower than the magnetic materials of Examples 1 to 10. The values of the saturation magnetization of Examples 1 to 10 and Comparative examples 1 to 4 each depend on a value of an applied magnetic field used for evaluation.

It is to be noted that, although some embodiments of the present invention have been described, these embodiments have been presented by way of example and are not intended to limit the scope of the invention. These novel embodiments can be implemented in a variety of other modes, and various omissions, substitutions, and modifications thereof can be made within the scope that does not depart from the spirit of the invention. Such embodiments and modifications thereof are encompassed by the scope and the spirit of the invention and also encompassed by the invention set forth in the claims and equivalents thereof.

What is claimed is:

1. A magnetic material expressed by
a composition formula 1: $(R_{1-x}Z_x)_aM_bT_c$
where R is at least one element selected from the group consisting of rare-earth elements, Z is at least one element selected from the group consisting of Y, Zr, and Hf, M is Fe or Fe and Co, T is at least one element selected from the group consisting of Ti, V, Nb, Ta, Mo, and W, x is a number satisfying 0.01≤x≤0.8, a is a number satisfying 4≤a≤20 atomic percent, b is a number satisfying b=(100−a−c) atomic percent, and c is a number satisfying 0<c<7 atomic percent,
the magnetic material comprising
a main phase having a $ThMn_{12}$ crystal structure,
wherein in the $ThMn_{12}$ crystal structure, when an amount of the element Z occupying 2a site is $Z_{2a}$ atomic percent, an amount of the element Z occupying 8i site is $Z_{8i}$ atomic percent, an amount of the element Z occupying 8j site is $Z_{8j}$ atomic percent, and an amount of the element Z occupying 8f site is $Z_{8f}$ atomic percent, $Z_{2a}$, $Z_{8i}$, $Z_{8j}$, and $Z_{8f}$ satisfy $(Z_{8i}+Z_{8j}+Z_{8f})/(Z_{2a}+Z_{8i}+Z_{8j}+Z_{8f})<0.09$.

2. The magnetic material according to claim 1,
wherein $Z_{8i}$, $Z_{8j}$, and $Z_{8f}$ satisfy $Z_{8f}>Z_{8j}$ and $Z_{8f}>Z_{8i}$.

3. The magnetic material according to claim 1,
wherein 50 atomic percent or more of the element T is Ti or Nb.

4. The magnetic material according to claim 1,
wherein 20 atomic percent or less of the element M is replaced with at least one element selected from the group consisting of Al, Si, Cr, Mn, Ni, Cu, and Ga.

5. The magnetic material according to claim 1,
wherein M in the composition formula 1 is represented by $Fe_{1-y}Co_y$, where y satisfies 0.01≤y≤0.3.

6. A permanent magnet, comprising the magnetic material according to claim 1.

7. A permanent magnet, comprising a sintered body of the magnetic material according to claim 1.

8. A rotary electrical machine, comprising:
a stator; and
a rotor,
wherein the stator or the rotor has the permanent magnet according to claim 7.

9. The rotary electrical machine according to claim 8,
wherein the rotor is connected to a turbine via a shaft.

10. A vehicle comprising the rotary electrical machine according to claim 8.

11. The vehicle according to claim 10,
wherein the rotor is connected to a shaft, and
rotation is transmitted to the shaft.

12. The magnetic material according to claim 1,
wherein x is a number satisfying 0.23<x<0.8.

13. The magnetic material according to claim 1,
wherein Z is Y and at least one element selected from the group consisting of Zr and Hf.

14. A magnetic material expressed by
a composition formula 2: $(R_{1-x}Z_{x-s})_aM_bT_cZ_{sa}$
where R is at least one element selected from the group consisting of rare-earth elements, Z is at least one element selected from the group consisting of Y, Zr, and Hf, M is Fe or Fe and Co, T is at least one element selected from the group consisting of Ti, V, Nb, Ta, Mo, and W, x is a number satisfying 0.01≤x≤0.8, a is a number satisfying 4≤a≤20 atomic percent, b is a number satisfying b=(100−a−c) atomic percent, c is a number satisfying 0<c<7 atomic percent, and s is a number satisfying b+c+sa=12a,
the magnetic material comprising:
a main phase having a $ThMn_{12}$ crystal structure,
wherein a ratio of s to x is less than 0.09.

15. The magnetic material according to claim 14,
wherein 50 atomic percent or more of the element T is Ti or Nb.
16. The magnetic material according to claim 14,
wherein 20 atomic percent or less of the element M is replaced with at least one element selected from the group consisting of Al, Si, Cr, Mn, Ni, Cu, and Ga.
17. The magnetic material according to claim 14,
wherein M in the composition formula 2 is represented by $Fe_{1-y}Co_y$, where y satisfies $0.01 \le y \le 0.3$.
18. The magnetic material according to claim 14,
wherein x is a number satisfying $0.23 < x < 0.8$.
19. The magnetic material according to claim 14,
wherein Z is Y and at least one element selected from the group consisting of Zr and Hf.

\* \* \* \* \*